United States Patent [19]
Keller

[11] 3,735,825
[45] May 29, 1973

[54] PRESSURE EQUALIZING SYSTEM FOR ROCK BITS

[75] Inventor: Wilbur Stanley Keller, Arlington, Tex.

[73] Assignee: Dresser Industries, Inc., Dallas, Tex.

[22] Filed: Mar. 7, 1972

[21] Appl. No.: 232,378

[52] U.S. Cl. ................................175/228, 175/372
[51] Int. Cl. ................................................E21b 9/10
[58] Field of Search......175/227–229, 371, 372, 337; 308/8.2

[56] References Cited

UNITED STATES PATENTS

| | | | |
|---|---|---|---|
| 2,906,504 | 9/1959 | Parks | 175/228 |
| 3,127,942 | 4/1964 | Neilson | 175/227 |
| 3,151,691 | 10/1964 | Goodwin | 175/228 X |
| 3,230,020 | 1/1966 | Gilbert et al. | 175/228 X |
| 3,303,898 | 2/1967 | Bercaru | 175/228 |
| 3,476,195 | 11/1969 | Galle | 175/228 |
| 3,534,823 | 10/1970 | Frederick | 175/337 |

*Primary Examiner*—David H. Brown
*Attorney*—Robert W. Mayer, Thomas P. Hubbard, Jr., Daniel Rubin et al.

[57] ABSTRACT

A lubricant reservoir is positioned in each arm of a three cone rotary rock bit to provide lubricant to bearings located between the bit's rotary cone cutters and the bearing shafts upon which the cutters rotate. A seal is positioned between the cutters and the bearing shafts to retain lubricant in the bearing area and to prevent borehole fluids and debris from entering the bearing area. A pressure equalizing passage provides communication between the lubricant reservoir and the outside of the bit. A two-way valve is positioned in the pressure equalizing passage to prevent excessive pressure differentials from building up between lubricant in the lubricant reservoir and fluid outside of the bit by allowing lubricant from the lubricant reservoir to escape to the outside of the bit and allowing fluid outside of the bit to enter the lubricant reservoir.

8 Claims, 5 Drawing Figures

PATENTED MAY 29 1973

PRESSURE EQUALIZING SYSTEM FOR ROCK BITS

BACKGROUND OF THE INVENTION

The present invention relates to the art of earth boring and, more particularly, to a system for providing lubricant to bearings between a cutter and a bearing shaft of a sealed bearing rotary rock bit thereby enabling the bit to operate for an extended period of time under changing environmental conditions.

A sealed bearing rotary rock bit, in general, consists of a main bit body adapted to be connected to a rotary drill string. The bit includes at least one rotatable cone cutter mounted upon a bearing shaft extending from the main bit body, bearing systems between the cone cutter and the bearing shaft to promote rotation of the cutter, means on the outer surface of the cone cutter for disintegrating the formations as the bit and the cutter rotate and a seal between the cone cutter and the bearing shaft to retain lubricant in the bearing area and to prevent borehole fluids and debris from entering the bearing area. A sufficient supply of lubricant is provided to the bearing systems throughout the lifetime of the bit by a lubrication system that includes a lubricant reservoir communicating with the bearing systems.

Problems have been encountered with prior art systems for supplying lubricant to the bearings because of the relatively long lifetime of modern bits and the wide variation of environmental conditions encountered during the drilling operation. When a sealed bearing rotary rock bit is lowered into a well bore the environmental pressure surrounding the bit increases at the rate of approximately one-half pound per square inch for each foot of depth. This means that at a depth of 10,000 feet the hydrostatic pressure on the outside of the bit could be 5,000 psi or more because of the weight of the drilling fluid in the well bore above the bit. In order for a lubrication system to function properly at the elevated down hole pressures, some means must be provided to equalize the internal pressure of the lubricant in the lubrication system with the hydrostatic pressure of the drilling fluid in the well bore. Pressure equalization has previously been accomplished by closing one end of the lubricant reservoir with a flexible membrane and venting the portion of the reservoir on the outer side of the membrane to a port on the surface of the bit. This system has only been partially successful because the flexible membrane tends to rupture under large pressure differentials and the pressure differential across the seal tends to push the seal element into a position where it is damaged by other elements of the bit.

A wide variety of other environmental conditions also affect the performance of the pressure equalizing system. For example, the temperature will rise as the well bore penetrates deeper into the earth and temperatures of up to 325° F are presently being encountered. Deep wells now being drilled are expected to result in environmental temperatures of up to 400° F and the drilling of steam wells results in environmental temperatures as high as 550° F. The elevated temperatures have an adverse effect on the lubricant, the structural elements of the lubrication system, the structural elements of the pressure equalizing system and a substantial increase in the pressure of the lubricant within the lubricant reservoir is generally encountered.

BRIEF DESCRIPTION OF THE PRIOR ART

In U.S. Pat. No. 3,370,895 to G. A. Cason, Jr., patented Feb. 27, 1968, a sealed bearing rotary rock bit with a lubricant reservoir is shown. A movable piston is positioned in the lubricant reservoir and the area above the piston is vented to the exterior of the bit to expose the upper side of the piston to the environmental pressure of the well bore. A seal is provided between each of the cutters and the arm upon which they are mounted. The seal retains lubricant in the bearing area and prevents ambient fluid and any entrained materials from entering the bearing area.

In U.S. Pat. No. 3,476,195 to E. M. Galle, patented Nov. 4, 1969, a sealed bearing rotary rock bit is shown that includes a lubricant reservoir and a flexible membrane that encloses one end of the lubricant reservoir for equalizing the internal pressure of lubricant in the lubricant reservoir with the hydrostatic pressure of drilling fluid in the well bore. A check valve is provided which operates at low pressure to permit flow out of the lubricant reservoir to the outside of the bit but blocks any flow in the reverse direction.

SUMMARY OF THE INVENTION

The present invention provides a pressure equalizing system for a sealed bearing rotary rock bit that will enable the bit to withstand a wide range of pressure and temperature variations.

A lubricant reservoir is positioned in an arm of a rotary rock bit to supply lubricant to the bearings between a rotatable cutter mounted on the bit arm and the bearing shaft upon which the cutter rotates. A seal means is positioned between the cutter and the bearing shaft for retaining lubricant in the bearing area and for preventing borehole fluids and debris from entering the bearing area. A pressure equalizing passage communicates between the lubricant reservoir and the area outside of the bit. A two-way valve means is positioned in the pressure equalizing passage for equalizing pressures by allowing lubricant in the lubricant reservoir to escape into the well bore and by allowing fluid in the well bore to enter the lubricant reservoir.

It is therefore an object of the present invention to provide an improved pressure equalizing system for a sealed bearing rotary rock bit.

It is a further object of the present invention to provide a lubrication system for a sealed bearing rotary rock bit that will operate effectively under changing pressure conditions.

It is a still further object of the present invention to provide a pressure equalizing system that will extend the useful lifetime of a sealed bearing rotary rock bit.

It is a still further object of the present invention to prevent excessive pressure differentials from occuring between the lubricant inside of a sealed bearing rotary rock bit and the fluid in the well bore surrounding the bit.

The above and other objects and advantages will become apparent from a consideration of the following detailed description of the invention when taken in conjunction with the accompanying drawings.

DETAILED DESCRIPTION OF THE INVENTION

Figure 1:
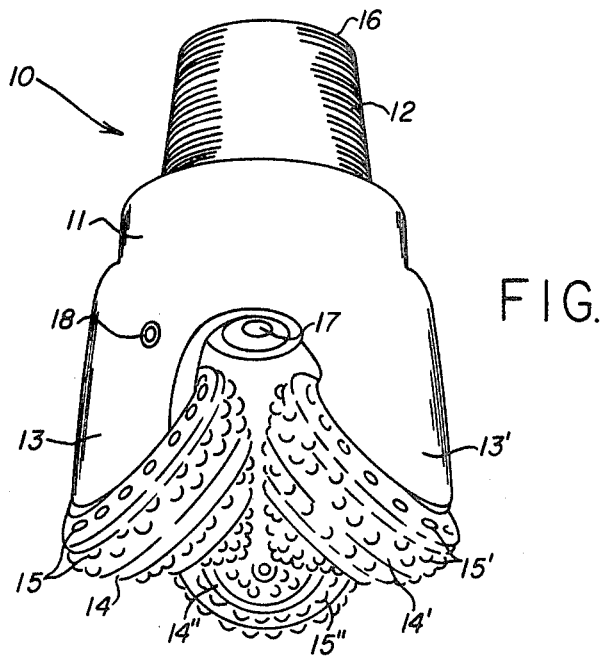
FIG. 1 shows a three cone rotary rock bit constructed in accordance with the present invention.

Referring now to FIG. 1, a three cone sealed bearing rotary rock bit generally designated by the reference number 10 is shown. The bit 10 includes a bit body 11 including an upper threaded portion 12. The threaded portion 12 allows the bit 10 to be connected to the lower end of a rotary drill string (not shown). Depending from the bit body 11 are three substantially identical arms with two of the arms, 13 and 13', being shown in FIG. 1. The lower end of each of the arms is provided with an extended journal portion and the details of this journal portion will be discussed subsequently. Three rotary cone cutters 14, 14' and 14" are rotatably positioned on three bearing pins extending from the arms. Each of the cutters 14, 14' and 14" includes cutting structure 15, 15' and 15" on its outer surface adapted to disintegrate the formations as the bit 10 is rotated and moved through the formations. The cutting structure 15, 15' and 15" is shown in the form of tungsten carbide inserts; however, it is to be understood that other cutting structures such as steel teeth may be used as the cutting structure on the cone cutters.

The bit 10 includes a central passageway 16 extending along the central axis of body 11 to allow drilling fluid to enter from the upper section of the drill string (not shown) immediately above and pass downward through three jet nozzles, one nozzle 17 being shown in FIG. 1, to the bottom of the well bore. In use, the bit 10 is connected as the lower member of a rotary drill string (not shown) and lowered into a well bore until the cone cutters engage the bottom of the well bore. Upon engagement with the bottom of the well bore, the drill string is rotated, rotating bit 10 therewith. Drilling fluid is forced downward through the interior passage of the rotary drill string and the drilling fluid continues through the central passageway 16 of bit 10 passing through the nozzles to the bottom of the well bore, thence, upward in the annulus between the rotary drill string and the wall of the well bore carrying with it the cuttings and debris from the drilling operation.

A lubricant reservoir is positioned in each of the three arms of the bit 10. A pressure equalizing passage, one of the pressure equalizing passages 18 being shown in FIG. 1, extends from each of the reservoirs to the area outside of the bit. A two-way valve means is positioned in each of the pressure equalizing passages for equalizing the pressure of lubricant in each of the lubricant reservoirs and the pressure of fluid in the well bore surrounding the bit 10.

The bit 10 encounters a wide range of changing environmental conditions during the drilling operation. As the bit is lowered into the well bore, the hydrostatic pressure of the fluid in the well bore surrounding the bit progressively increases as the bit is moved deeper into the earth. As the drilling operation proceeds, the temperature of the bit may increase thereby increasing the pressure of lubricant within the lubricant reservoir. The pressure equalizing passage and the two-way valve means prevents a damaging pressure differential from occurring between the pressure of lubricant in the lubricant reservoir and the pressure of fluid in the well bore surrounding the bit.

Figure 2:
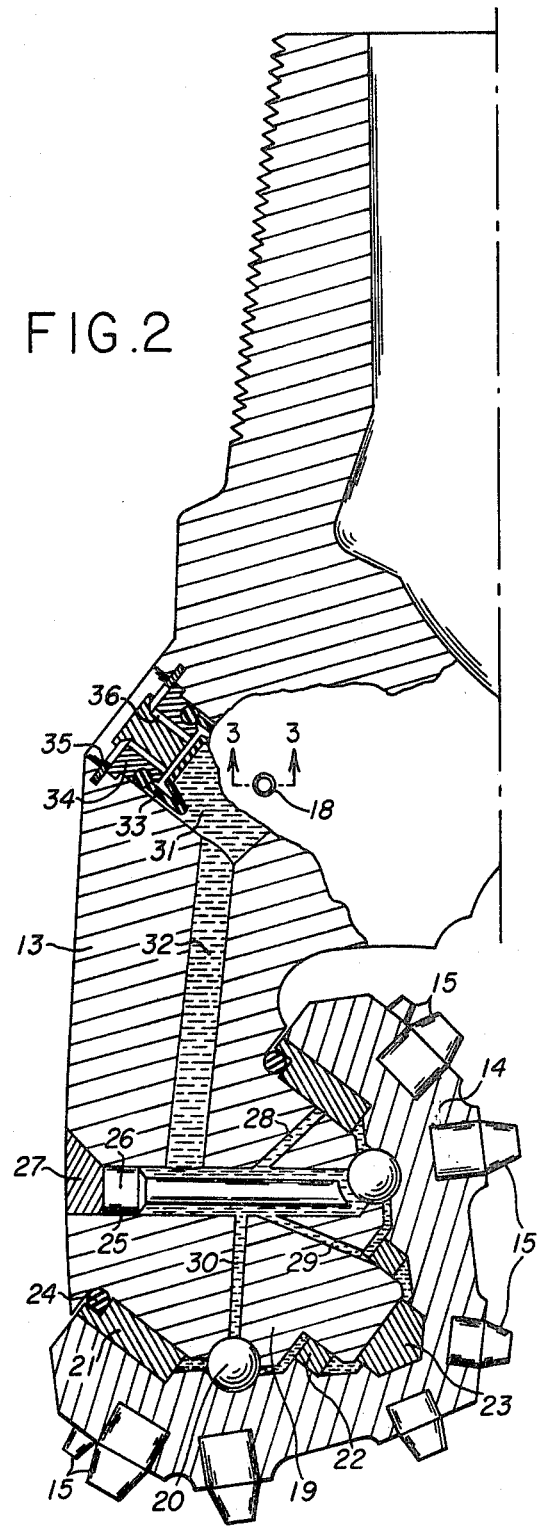
FIG. 2 is a sectional view of one arm of the bit shown in FIG. 1.

Referring now to FIG. 2, a sectional view of one arm 13 of bit 10 is shown. The cutter 14 is rotatably mounted on the journal portion of the arm 13 and adapted to disintegrate earth formations as the bit 10 is rotated. The cutting structure 15 on the outer surface of cutter 14 contacts and disintegrates the formations in a manner that is well known in the art. The journal portion of arm 13 consists of a bearing pin 19 upon which the cutter 14 is mounted. A plurality of bearing systems are located in the bearing area between the cutter 14 and bearing pin 19. The bearing systems in the bearing area include a series of ball bearings 20, an outer friction bearing 21, an inner friction bearing 22 and a thrust button 23.

A seal 24 is positioned between the cutter 14 and the bearing pin 19. This seal 24 retains lubricant in the bearing area around the bearing systems and prevents any materials in the well bore from contacting the bearings. A passage 25 is provided to allow lubricant to be transmitted to the bearing systems. The passage 25, as shown, allows the balls that make up the ball bearing system 20 to be inserted into position after the cone cutter 14 is placed on the bearing pin 19. The series of ball bearings 20 serves to lock the cone cutter 14 on bearing pin 19. After the balls are in place, a plug 26 is inserted into the passageway 25 and welded therein by weld 27. Plug 26 has a reduced diameter throughout the major portion of its length to allow lubricant to be transmitted to the bearing systems. Additional passages 28, 29 and 30 extend from passage 25 to locations in the bearing area to insure a sufficient supply of lubricant to the bearing systems 20, 21, 22 and 23.

A lubricant reservoir 31 is positioned in arm 13 and the lubricant reservoir 31 is connected to the passages that communicate with the bearing area by a lubricant passage 32. A sufficient supply of lubricant is stored in the lubricant reservoir 31 to supply lubricant to the bearing systems throughout the lifetime of the bit. A flexible diaphragm 33 closes the upper end of the lubricant reservoir 31. The flexible diaphragm 33 is held in place by a cap 34 locked in the upper end of the lubricant reservoir 31 by a snap ring 35. A passage 36 extends through the cap 34 to allow fluid in the well bore to contact one side of the flexible diaphragm 33. The pressure of fluid in the well bore is transmitted to the flexible diaphragm 33 and from the flexible diaphragm 33 to lubricant in the lubricant reservoir 31 to assist in eliminating any pressure differentials between the pressure of lubricant in the lubricant reservoir 31 and the pressure of fluid in the well bore. It can be appreciated that the flexible diaphragm 33 may unable to compensate for pressure variations of large magnitudes.

A pressure equalizing passage 18 extends from the surface of bit 10 to the lubricant reservoir 31 to assist in eliminating any pressure differentials between the pressure of lubricant in the lubricant reservoir 31 and the pressure of fluid in the well bore. A two-way valve means is positioned in the pressure equalizing passage 18 for allowing lubricant in the lubricant reservoir 31 to escape into the well bore and for allowing fluid in the well bore to enter the lubricant reservoir 31.

Figure 3:
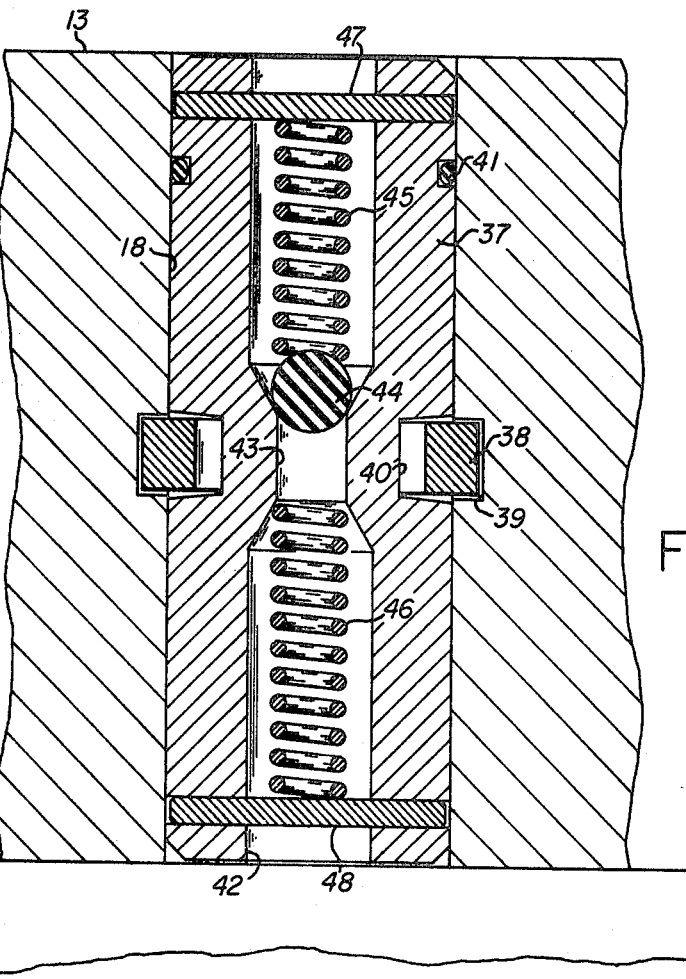
FIG. 3 shows the structural details of a two-way valve of the present invention.

Referring now to FIG. 3, the two-way valve means positioned in the pressure equalizing passage 18 is shown in detail. The two-way valve means includes a valve body 37 having a diameter just slightly smaller than the diameter of the pressure equalizing passage 18. The valve body 37 is held in position in the pressure equalizing passage 18 by a snap ring 38 that fits within a groove 39 in bit arm 13 and a groove 40 in the valve body 37. An O-ring seal 41 is positioned in a groove in the valve body 37 to insure a fluid-tight seal between the valve body 37 and the pressure equalizing passage 18. The valve body 37 includes a central passage 42 and the central passage 42 has a section 43 of reduced diameter. A flexible rubber ball 44 having a diameter somewhat larger then the reduced diameter portion 43 is positioned proximate the reduced diameter portion 43 and retained in the central passage 42 by a pair of springs 45 and 46. The springs 45 and 46 are held in place by a pair of pins 47 and 48 respectively that extend into holes in the valve body 37. The ball 44 is constructed of a flexible material such as rubber to allow it to be compressed and forced through the reduced diameter section 43 of the valve body 37 by fluid pressure from either the well bore or the lubricant reservoir 31.

The structural details of a bit constructed in accordance with the present invention having been described, the operation of the bit 10 will now be considered. The bit 10 is connected to the lower end of a rotary drill string and lowered into the well bore. The hydrostatic pressure of fluid in the well bore increases as the bit 10 is lowered deeper into the well bore. Fluid in the well bore contacts one side of the flexible diaphragm 33 through the passage 36 in cap 34. As the fluid pressure increases, the flexible diaphragm 33 is deformed to assist in equalizing the pressure of lubricant in the lubricant reservoir 31 and fluid in the well bore surrounding bit 10.

As the bit is rotated and the drilling operation proceeds, the temperature of the bit and the temperature of lubricant inside of the lubricant reservoir increases due to heat generated during the drilling operation and upon encountering high temperature environmental conditions. The flexible diaphragm 33 is formed to prevent pressure differentials from occuring between the pressure of lubricant in the lubricant reservoir 31 and the pressure of fluid in the well bore surrounding the bit 10. Should excessive pressure differentials occur, the flexible rubber ball 44 is forced through the reduced diameter portion 43 of the central passage 42 and moved against one of the springs 45 or 46 to allow flow into or out of the lubricant reservoir 31. Fluid pressure on the flexible rubber ball 44 will act against it causing it to elongate and move through the reduced diameter portion 43 compressing one of the springs 45 or 46 and allowing flow through the pressure equalizing passage 18. The pressure required to open the two-way valve can be controlled by the springs and the amount of reduction of the reduced diameter portion 43 of the passage 42.

Figure 4:
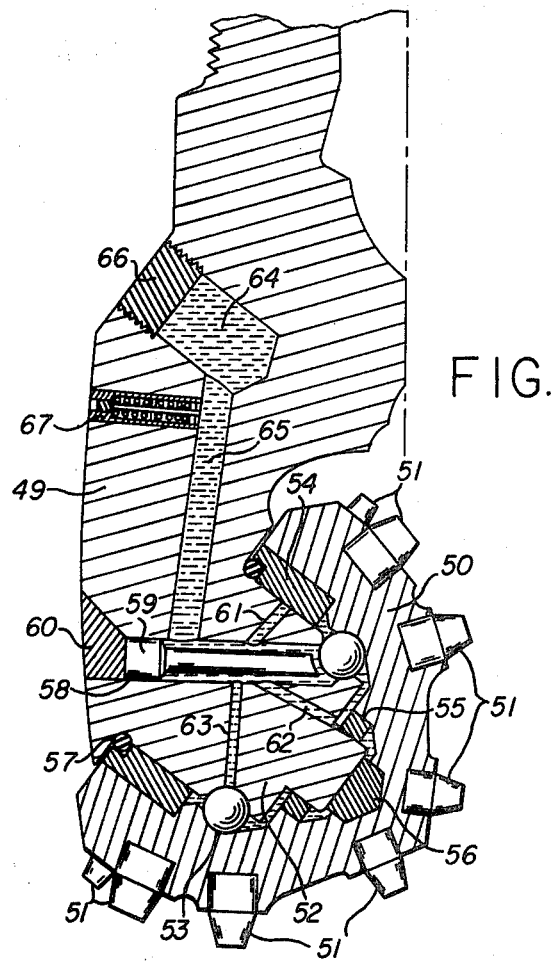
FIG. 4 illustrates another embodiment of the present invention.

Referring now to FIG. 4, a sectional view of one arm 49 of another embodiment of a sealed bearing rotary rock bit of the present invention is shown. A cutter 50 is rotatably mounted on the journal portion of the bit arm 49 and adapted to disintegrate the earth formations as the bit is rotated. The cutting structure 51 on the outer surface of cutter 50 contacts and disintegrates the formation in a manner that is well known in the art. The journal portion of arm 49 consists of a bearing pin 52 upon which the cutter 50 is mounted. A plurality of bearing systems are located in the bearing area between the cutter 50 and the bearing pin 52. The bearing systems in the bearing area include a series of ball bearings 53, an outer friction bearing 54, an inner friction bearing 55 and a thrust button 56.

A seal 57 is positioned between the cutter 50 and the bearing pin 52. This seal 57 retains lubricant in the bearing area around the bearing systems and prevents any materials in the well bore from contacting the bearings. A passage 58 is provided to allow lubricant to be transmitted to the bearing systems. The passage 58, as shown, allows the balls that make up the ball bearing system 53 to be inserted into position after the cone cutter 50 is placed on the bearing pin 52. The series of ball bearings 53 serves to lock the cone cutter 50 on bearing pin 52. After the balls are in place, a plug 59 is inserted into the passage 58 and welded therein by weld 60. Plug 59 has a reduced diameter throughout the major portion of its length to allow lubricant to be transmitted to the bearing systems. Additional passages 61, 62 and 63 extend from the passage 58 to locations in the bearing area to insure a sufficient supply of lubricant to the bearing systems 53, 54, 55 and 56.

A lubricant reservoir 64 is positioned in the arm 49 and the lubricant reservoir 64 is connected to the passages to the bearing area by a lubricant passage 65. A sufficient supply of lubricant is stored in the lubricant reservoir 64 to supply lubricant to the bearing systems through the lifetime of the bit. A solid metal cap 66 closes the upper end of the lubricant reservoir 64. A pressure equalizing passage 67 extends from the surface of the arm 49 to the lubricant passage 65 to eliminate any pressure differentials between the pressure of lubricant in the lubricant reservoir 64 and the pressure of fluid in the well bore. A two-way valve means is positioned in the pressure equalizing passage 67 for allowing lubricant from the lubricant reservoir 64 to escape into the well bore and for allowing fluid in the well bore to enter the lubricant reservoir 64.

Figure 5:
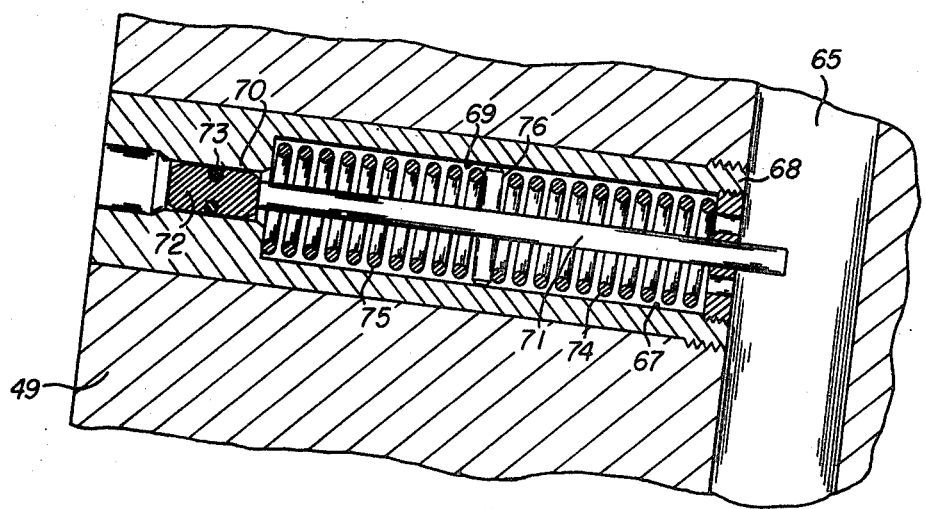
FIG. 5 shows the structural details of a two-way valve positioned in the arm of the bit shown in FIG. 4.

Referring now to FIG. 5, the two-way valve means positioned in the pressure equalizing passage 67 is shown in detail. The two-way valve means includes a valve body 68 having a diameter slightly smaller than the diameter of the pressure equalizing passage 67. The inner end of the valve body 68 is threaded to engage matching threads in the pressure equalizing passage 67. The valve body 68 includes a central passage 69 and the central passage 69 has a section 70 of reduced diameter. A plunger 71 is positioned in the central passage 69. The enlarged head 72 of the plunger is just slightly smaller than the reduced diameter portion 70 of the passage 69 and O-ring seal 73 insures a fluid-tight seal between the head of the plunger 72 and the reduced diameter portion 70 of the passage 69. The plunger 71 is held in position by a pair of springs 74 and 75 that contact a projection 76 extending from the plunger 71.

The structural details of a second embodiment of a bit constructed in accordance with the present invention having been described, the operation of the bit will now be considered. As the bit is lowered into the well bore the pressure outside of the bit increases. The fluid in the well bore surrounding the bit enters the passage 70 and acts on the enlarged head 72 of the plunger 71 causing spring 74 to be compressed and allowing fluid from the well bore to enter lubricant passage 65 and the lubricant reservoir 64. This prevents a pressure differential from occurring between the pressure of fluid in the well bore surrounding the bit and the pressure of lubricant in the lubricant reservoir 64.

As the drilling operation proceeds, the pressure of lubricant in the lubricant reservoir 64 may increase due to heat generated during the drilling operation or due to heat from the formations such as during the drilling of steam wells. The pressure of the lubricant in the lubricant passage 65 acts against the enlarged head 72 of the plunger 71 thereby compressing spring 75 and allowing lubricant to pass into the well bore. This prevents a pressure differential from occurring between the pressure of lubricant in the lubricant reservoir 64 and the pressure of fluid in the well bore surrounding the bit. It can be appreciated that the springs 74 and 75 are located on the lubricant side of the enlarged head 72 of plunger 71. The springs 74 and 75 will therefore be located in lubricant substantially the entire time the bit is being operated and the two-way means will not be adversely affected by fluids in the well bore.

The embodiments of the invention in which an exclusive property or privilege is claimed are defined as follows:

1. A sealed bearing rotary rock bit for drilling in a fluid filled borehole, comprising:
   a bit body;
   at least one bearing shaft extending from said bit body;
   a cutter rotatably mounted upon said bearing shaft; bearing means between said cutter and said bearing shaft for promoting rotation of said cutter;
   a lubricant reservoir in said bit body, said lubricant reservoir communicatIng with said bearing means;
   a pressure equalizing passage means in said bit body for providing fluid communication between the lubricant reservoir and the fluid filled borehole; and a two-way valve means in said fluid passage for allowing lubricant in said lubricant reservoir to escape into the borehole and for allowing fluid in the borehole to enter said lubricant reservoir.

2. The sealed bearing rotary rock bit of claim 1 including a flexible diaphragm in said lubricant reservoir dividing said lubricant reservoir into a lubricant portion and a pressure equalizing portion and a passage in said bit body to provide fluid communication between said pressure equalizing portion of said lubricant reservoir and said fluid filled borehole with said pressure equalizing passage means providing fluid communication between the lubricant portion of said lubricant reservoir and the fluid filled borehole.

3. A rock bit comprising:
   a bit body;
   at least one arm extending from said body;
   a cone cutter mounted upon said arm; bearing means between said cone cutter and said arm for promoting rotation of said cutter;
   a seal between said cone cutter and said arm;
   a lubricant reservoir in said arm;
   a lubricant passage extending from said lubricant reservoir to said bearing means;
   a pressure equalizing passage in said arm, said pressure equalizing passage communicating said lubricant reservoir with the outside of the bit; and
   valve means in said pressure equalizing passage for allowing lubricant to escape from said lubricant reservoir and for allowing fluid to enter said lubricant reservoir thereby equalizing pressures.

4. The rock bit of claim 3 including a flexible diaphragm in said lubricant reservoir dividing said lubricant reservoir into a lubricant portion and a pressure equalizing portion and a vent passage in said arm connecting said pressure equalizing portion of said lubricant reservoir with the outside of the bit with said pressure equalizing passage communicating the lubricant portion of said lubricant reservoir with the outside of the bit.

5. A rotary rock bit for drilling in a fluid filled borehole, comprising:
   a main bit body, said main bit body including three individual arms;
   a rotatable cutter mounted upon each of said arms;
   bearing means between each of said cutters and said arms;
   a seal between each of said cutters and said arms;
   a reservoir in each of said arms, each of said reservoirs containing lubricant;
   a lubricant passage in each of said arms, each lubricant passage extending from a reservoir to a respective bearing means;
   a pressure equalizing passage means in each of said arms for communicating each of said reservoirs with the area outside the bit; and
   two-way valve means in each of said pressure equalizing passage means for allowing lubricant in the lubricant reservoir to escape into the borehole and for allowing fluid in the borehole to enter said lubricant reservoir thereby equalizing pressures.

6. The rotary rock bit of claim 5 including a flexible diaphragm in each of said reservoirs dividing said reservoirs into a lubricant portion and a pressure equalizing portion and a vent passage in each of said arms connecting a respective pressure equalizing portion of a reservoir with the area outside of the bit, with said pressure equalizing passage means communicating the lubricant portion of a respective reservoir with the area outside of the bit.

7. In a rock bit that includes a bit body, at least one arm extending from said bit body, said arm terminating in a bearing shaft, a cone cutter rotatably mounted upon said bearing shaft, bearing means between said cone cutter and said bearing shaft for promoting rotation of said cone cutter upon said bearing shaft, and a seal positioned between the open end of said cone cutter and said bearing shaft; a pressure equalizing system, comprising:
   a lubricant reservoir in said arm,
   a lubricant passage communicating said lubricant reservoir with said bearing means,
   a pressure equalizing passage communicating said lubricant reservoir with the outside of the bit, and
   two-way valve means in said pressure equalizing passage for allowing fluid flow into and out of said lubricant reservoir.

8. The rock bit of claim 7 including a flexible diaphragm in said reservoir dividing said reservoir into a lubricant portion and a pressure equalizing portion and a vent passage communicating said pressure equalizing portion of said lubricant reservoir with the outside of the bit and wherein said pressure equalizing passage communicates said lubricant portion of said lubricant reservoir with the outside of the bit.

* * * * *